United States Patent [19]

Griesshaber

[11] 4,325,082
[45] Apr. 13, 1982

[54] DIGITAL MEASUREMENT SYSTEM FOR AUTOMATICALLY FOCUSING A TELEVISION CAMERA

[75] Inventor: Karl H. Griesshaber, San Jose, Calif.

[73] Assignee: Ampex Corporation, Redwood City, Calif.

[21] Appl. No.: 176,737

[22] Filed: Aug. 11, 1980

[51] Int. Cl.³ .............................................. H04N 5/34
[52] U.S. Cl. .................................................. 358/218
[58] Field of Search .................... 358/218; 315/31 TV

[56] References Cited

U.S. PATENT DOCUMENTS 3,356,792  12/1967  Peters .................................. 358/218
3,409,799  11/1968  Kurzweil, Jr. et al. ............ 358/218

*Primary Examiner*—Richard Murray
*Attorney, Agent, or Firm*—George B. Almeida; Joel D. Talcott

[57] ABSTRACT

The checkered black/white test pattern used during a television camera setup mode for the automatic correction of spatial registration, shading, and gamma errors, is also used to obtain digital data for automatically focusing the camera. The system detects the variation of the optical and the electrical focus by detecting the corresponding variation in the risetime of the signal generated as the electron beam spot scans across a transition in the test pattern. At an optimum focus condition the digital data is at a maximum value, i.e., the risetime is at a maximum rate. The focus data is stored for subsequent use during the camera operating mode.

9 Claims, 4 Drawing Figures

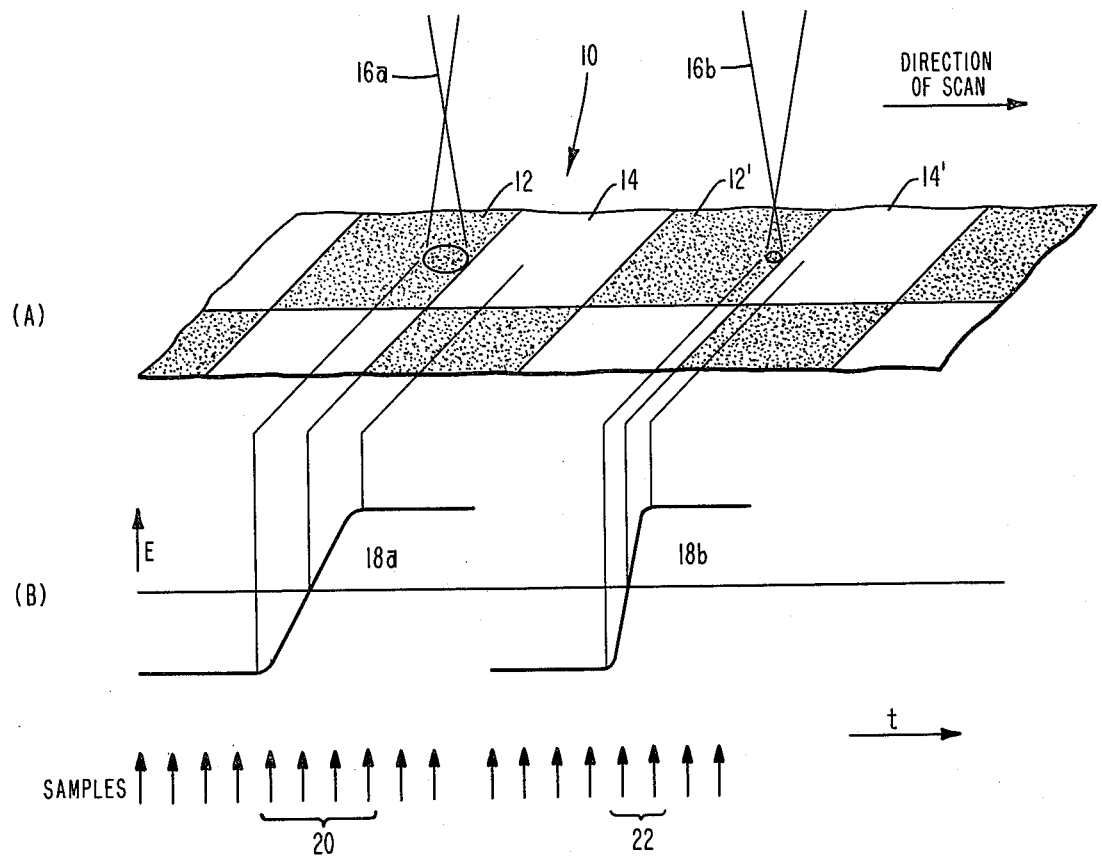
FIG_1

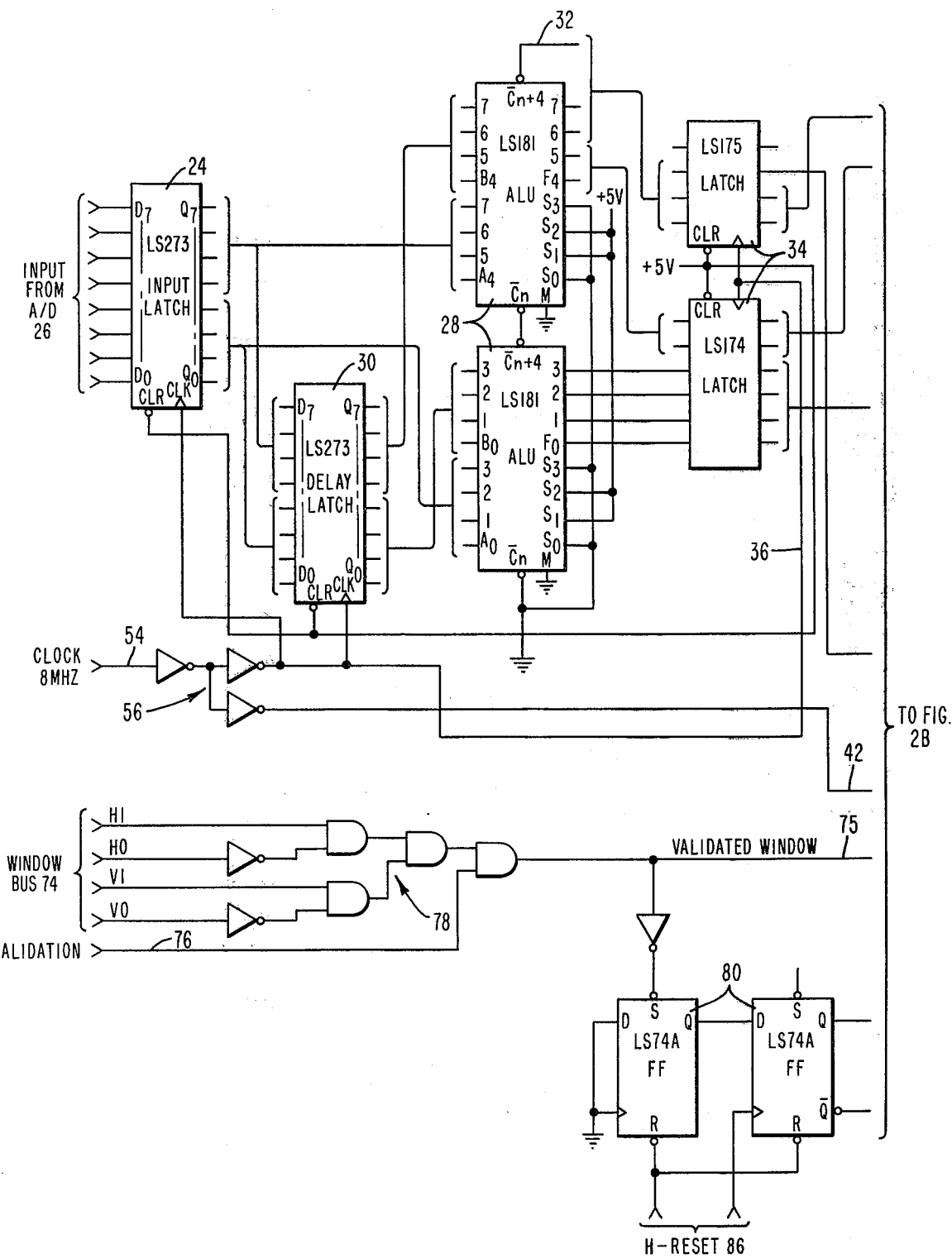
FIG_2A

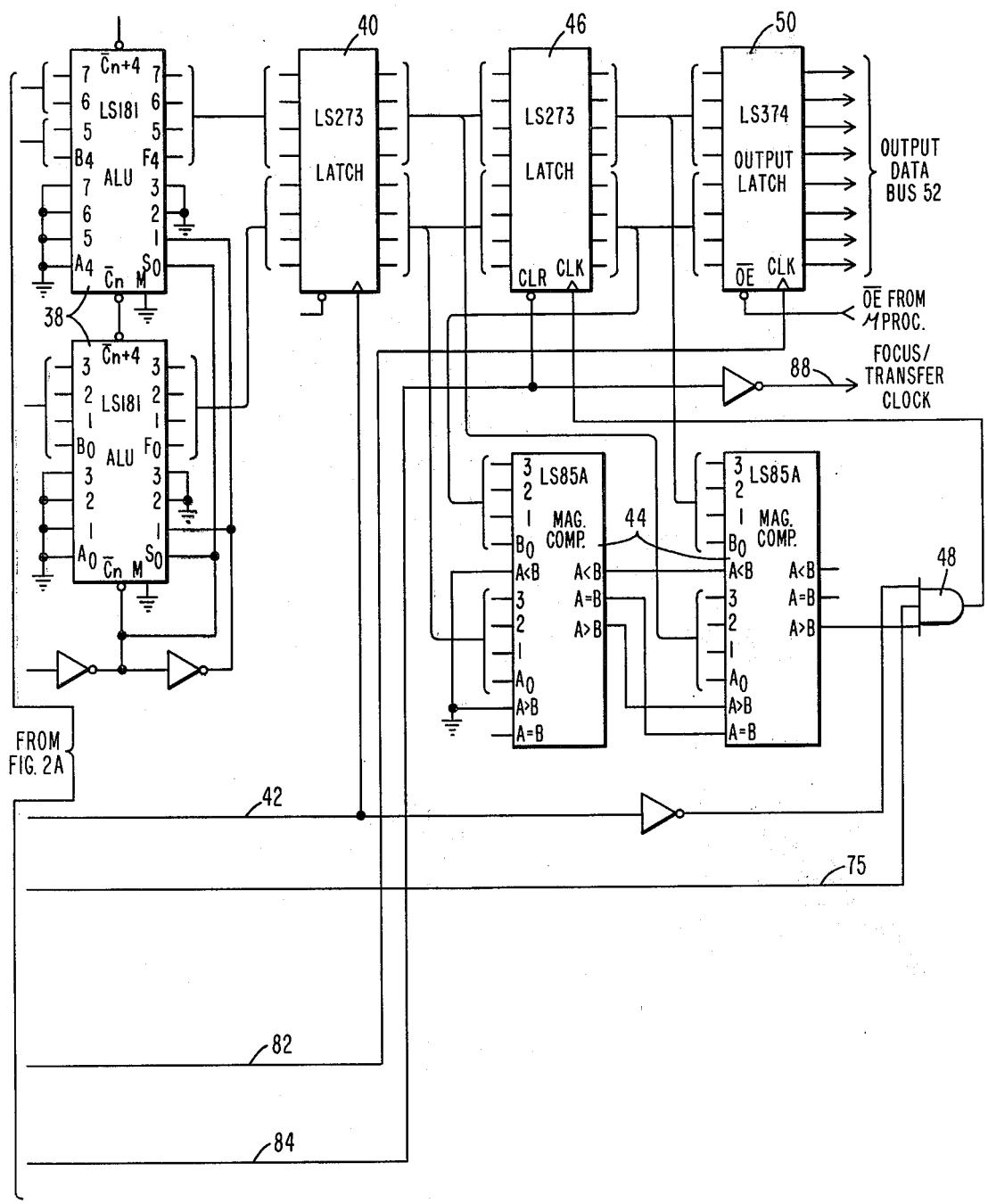
FIG_2B

DIGITAL MEASUREMENT SYSTEM FOR AUTOMATICALLY FOCUSING A TELEVISION CAMERA

CROSS REFERENCE TO RELATED APPLICATIONS:

A Digital Error Measuring Circuit For Shading & Registration Errors in Television Cameras, Ser. No. 139,604, filed Apr. 11, 1980, to Karl H. Griesshaber.

BACKGROUND OF THE INVENTION

The invention relates to means for automatically focusing a television camera, and particularly to a circuit for obtaining data during the setup procedure which accurately defines the optimum focus conditions.

Various schemes are available in the television camera art, to provide for the manual and/or automatic focus of electronic news gathering (ENG) or of broadcast quality studio cameras.

Thus for example, typical prior art focusing systems employ a conventional resolution chart having vertically extending lines of varying spacings to define grids across which the beam is scanned. The line grids may be replaced, in other systems, with spaced series of wedge-shaped lines of selected spacings. The various types of grids are generally placed in the center of the chart, i.e., in automatic setup camera systems, in the center of a diascope test pattern where the focus conditions are at an optimum. As the beam is scanned across the various grids during the camera setup mode, an alternating waveform is generated by the tube and is detected. Optimum electrical focus conditions exist when the peak-to-peak values of the waveform are at a maximum. The maximum detected values are used during the camera operating mode by manually setting potentiometer means, or by automatically applying an electrical focus correction via an automatic error corrector system.

Prior art automatic focusing systems thus utilize analog means for measuring and correcting the focus of cameras, and therefore have the disadvantages inherent in analog systems, i.e., drift, noise, etc. In addition, prior systems require the use of an additional chart, i.e., the resolution chart with grids of previous mention.

SUMMARY OF THE INVENTION

The invention system provides a relatively simple digital circuit, which is part of, and integral with, the basic camera setup system, and which accurately defines the optimum focus condition employed during the camera operating mode.

More particularly, during the setup mode of a television camera, the scan beam of a camera tube is disposed to scan the test pattern used to provide spatial and shading error corrections, whereby the tube generates a waveform commensurate with the black/white areas, or checkers, of the pattern. If follows that variations in the waveform risetimes are proportional to the corresponding variation in the scan beam focus. The waveform, and thus each risetime, is sampled and digitized, and the difference between two successive samples is detected. The digital difference between samples is very small when the beam is scanning between transitions in the test pattern. When scanning through a transition, however, the digital difference is relatively large, and the magnitude thereof is proportional to the risetime of the waveform. The risetime in turn is proportional to the focus condition, i.e., an optimum focus condition generates the fastest risetime, and vice versa. The magnitudes of successive digital differences are compared and the largest value, which corresponds to the optimum focus condition, is held for a selected measurement interval. The largest differences are averaged over successive measurement intervals to improve the signal-to-noise ratio, and the resulting difference data are stored in the camera's associated correction circuitry for subsequent use in providing the optimum focus condition during the camera operating mode.

Thus it is an object of the invention to provide an improved automatic focus system of relatively simple design.

Another object is to provide a digital measurement circuit for accurately determining the optimum focus condition for a television camera employing the same test pattern used to provide spatial/shading error corrections.

Still another object is to provide a digital system for determining the optimum focus condition which is integral with, and utilizes, the automatic setup system of an automated television camera.

BRIEF DESCRIPTION OF THE DRAWINGS

FIG. 1A, 1B is a graph depicting different focus conditions of a scanning electron beam, and the respective waveforms of correspondingly proportional risetimes.

FIG. 2A, 2B is a schematic diagram of the invention circuitry for detecting the different risetimes of the waveforms of FIG. 1B and for generating digital data indicative of the optimum focus condition.

DESCRIPTION OF THE PREFERRED EMBODIMENTS

The system of description herein provides for detecting variations in the optical focus as well as the electrical focus of a television camera during the camera setup mode of operation. Digital data indicative of the optimum focus condition are stored and subsequently used during the camera operating mode.

To this end, referring to FIG. 1, the system employs a black and white checkered test pattern 10 which is used to provide the spatial and shading error measurements and corrections. The pattern is formed of rows of alternate black, white, black, white, etc., checkers 12, 14, 12', 14', etc., respectively. In the focus mode, the checkers are scanned by a camera tube's electron beam 16 during setup, to generate a resulting waveform which alternates in magnitude from a black voltage level to a white voltage level. Thus the waveform includes rapid voltage transitions between the levels corresponding to the transitions from the black/white/black, etc., checkers forming the test pattern 10. An example of a black/white checkered test pattern which is scanned by a camera tube's electron beam, and of an associated tube raster error measurement system, is typified in the above cross-referenced patent application Ser. No. 139,604, to K. H. Griesshaber, assigned to the same assignee as this application and incorporated herein by reference.

Thus, FIG. 1A depicts an electron beam 16 under different focus conditions; i.e., beam 16a is an undesirable out-of-focus condition, while beam 16b is in the close to optimum focus condition. It may be seen that the time interval of the defocussed (and thus larger diameter) beam 16a as it crosses a transition between the black and white checkers 12, 14 respectively, is correspondingly greater than the time interval of the more closely focussed (and thus smaller diameter) beam 16b as it crosses the transition between checkers 12', 14'. It follows that the respective waveform voltage transitions 18a, 18b (FIG. 1B) are correspondingly slower and faster, respectively. That is, the beam 16b which is in more closely focused condition provides the faster, and thus readily-detectable risetime, when compared to the out-of-focus beam 16a. Thus, waveform transition 18a occurs over a time interval of, for example, approximately three digital sample periods as depicted at 20, FIG. 1B, whereas transition 18b occurs over a time interval of approximately one sample period as typified at 22. It may be seen that the variations in focus conditions are directly reflected in the variation of the corresponding risetimes of the beam as it crosses the checker transitions.

The system of description herein, detects this variation in risetimes, and particularly detects the largest magnitude of risetime per selected sample period, to provide digital data which defines the optimum focus condition. This digital data is then stored and subsequently used to provide automatic focussing of the scan beam during the camera operating mode.

FIG. 2A, 2B depicts an implementation of the system as employed, for example, with the error measurement system of the aforementioned copending application Ser. No. 139,604. Several components of the prior system are shared with the system of description herein, i.e., are also used in the vertical channel portion of the vertical spatial error measurement circuitry of the prior application. However, for completeness of description, the shared components required in the instant system are included herein.

Thus the digitized data corresponding to the waveforms of FIG. 1B, which are generated by the electron beam scan of the test pattern 10 of FIG. 1A during the setup mode of operation, are supplied via an analog-to-digital (A/D) converter (not shown) to an input latch 24, via an input data bus 26, in the form of 8-bit words. The input latch 24 is coupled to, and drives, the A inputs of a differentiator 28, and is also fed to a delay latch 30. The differentiator 28 is an arithmetic logic unit (ALU) which, in the focus measurement mode, is programmed as a subtractor. The latch 30 supplies the data, delayed by one sample interval, to the B input of the differentiator 28. The output of the differentiator is the difference signal A-B, or the digital difference between two successive sample values of the input waveforms exemplified in FIG. 1B.

The digital difference values, i.e., numbers, are very small during the time intervals when the beam is totally scanning on either a black or a white checker; e.g., checkers 12, 14, 12', 14' of FIG. 1A. However, when the beam crosses the transitions from a black checker 12, 12', etc., to a white checker 14, 14', etc., the numbers are positive, and their greatly increased magnitudes are dependent upon risetimes of the waveform, as depicted in FIG. 1B. The corresponding sign bit for positive numbers is a "0", generated on a line 32 from the carry output of the differentiator 28, which line is coupled to a latch 34 along with the 8-bit difference data word A-B.

At the transition from a white checker 14, 14', etc., to a black checker 12, 12', etc., the numbers are negative (2's complement), the sign bit is a "1" and the greatly increased magnitudes are also dependent upon the risetimes of the waveform transitions.

The difference data from the differentiator 28 is reclocked in the latch 34 in response to an 8 MegaHertz (MHz) related clock on a clock line 36, further described below, and is then fed to the B input of a rectifying arithmetic logic unit (ALU) 38. The A input of the latter is grounded. The sign bit on the line 32 is used to control the program inputs of the ALU 38. If the sign bit is "0", the ALU 38 provides the output function $F=A+B$, wherein $A=0$. The output thus is $F=B$, or no change from input to output. If the sign bit on line 32 is a "1", however, then $F=(A+\overline{B})$ plus 1, wherein $A=0$, and $F=\overline{B}+1$, or the 2's complement. Thus, the ALU 38 converts the negative numbers, from the differentiator 28 and latch 34, to positive numbers with the same magnitudes.

The output data from the rectifying ALU 38 are reclocked in a latch 40 via a further 8 MHz related clock on a line 42 thereto, and are fed to peak detector means, i.e., to the A input of a magnitude comparator 44, and also to a largest-value latch 46. The output of the latch 46 is fed back to the B input of the comparator 44. The magnitude comparator 44 provides an output function $A>B$ to the clock input of the latch 46 via an AND gate 48. The output of the greatest-value latch 46 is also coupled to an output latch 50, and thence to an output data bus 52. The output data corresponds to the largest digital values obtained during the fastest voltage risetimes of the scanning electron beam and thus to the optimum focus condition for the camera tube.

An associated control logic circuit includes various gate combinations coupled to various incoming control input signals, which gates supply the required control and timing signals for the components of the focus measurement system. Various portions of the control logic circuit are also shared with the error measurement circuitry of the copending application of previous mention. Thus, the basic system clock of 8 MHz is provided via input 54 and inverters 56 to the clock inputs of the input latch 24, the delay latch 30, the latch 40 via line 42, and to the AND gate 48. The inverters 56 are also coupled to the clock input of the latch 34 via the line 36, to provide the reclocking of the difference data from the differentiator 28.

Horizontal and vertical window signals H1, H0, and V1, V0 are supplied via an input bus 74, and a validation signal is supplied on a line 76. The window and validation signals are fed to AND gates 78 which supply a validated window signal to the AND gate 48 via a line 75, as well as to a pair of pulse forming, D-type flip-flops 80 via an inverter. The latter provide Q and $\overline{Q}$ outputs on lines 82, 84 which extend to the clock input of the output latch 50, and to the clear input of the greatest-value latch 46, respectively. The output from the flip-flops 80 is activated by the validated window signal and is ANDed with the H-reset function, whereby if both signals are true, the output latch 50 is clocked via the line 82, and latch 46 is cleared via the line 84. The flip-flops 80 are reset via the H-reset commands on lines 86.

An output enable signal is fed to the $\overline{OE}$ input of the output latch 50 from the interface board and system microprocessor (not shown) via a line 87. A focus-/transfer clock is supplied via a line 88 when the largest value latch 46 is cleared, and indicates to the system microprocessor that data has been transferred and is available at the output data bus 52.

The latch 46 is reset at the start of the measurement interval, i.e., at the start of a selected time window generated via the window bus 74. The command causes the A>B output of the magnitude comparator 44 to go high for any digital data number greater than zero which appears at the output of the latch 40. The A>B signal is gated with the validated window signal on the line 75 and, if true, the signal transfers the clock pulse to the greatest value latch 46 via the AND gate 48. The validated window signal insures that the measurement for optimum focus condition occurs within a prescribed area of the video fluid, for example, the center, and that the beam is scanning a recognized pattern at the time of measurement. The value stored in the latch 46 increases during the first checker transition by the beam. The latch 46 holds the peak value until the next transition, or until a higher digital value appears at the output of the latch 40, within the measurement period, i.e., the window.

The output of the latch 46 is fed to the microprocessor (not shown) of the overall system via the output latch 50, whereby the data of successive measurement intervals is averaged to provide an improved signal-to-noise ratio of the measurement.

What is claimed is:

1. A system for measuring, during a television camera setup mode, the optimum focus condition for an electron beam in a pickup tube, wherein the tube generates a waveform of abrupt transitions corresponding to transitions in a black/white checkered test pattern, comprising:
    means for supplying successive digital data samples indicative of the waveform transitions;
    latch means for delaying alternate digital data samples by one sample interval;
    means coupled to receive the delayed and undelayed digital data samples and for generating the digital difference therebetween corresponding to the maximum rate of risetime of a waveform transition while indicating the polarity of the digital difference;
    means coupled to the means for generating for detecting the largest digital differences corresponding to the maximum rate of risetime of the waveform transition; and
    means for holding the largest digital differences corresponding to the optimum focus condition in response to the means for detecting.

2. The system of claim 1 further including;
    digital logic control means coupled to the means for holding for providing a selected measurement interval during which the largest digital differences are generated.

3. The system of claim 2 further including;
    rectifier means coupled to the means for generating for supplying the digital differences to the means for holding in one polarity.

4. The system of claim 3 wherein the digital logic control means includes;
    window generating means for generating the selected measurement interval in the horizontal and vertical directions, said means for holding being responsive to the window generating means.

5. The system of claim 4 wherein the means for generating further includes;
    digital differentiator means disposed to receive undelayed samples of the waveform and the delayed samples from the delay latch means, to provide the successive digital differences therebetween.

6. The system of claim 5 wherein;
    the means for detecting the largest digital differences includes magnitude comparator means for clocking the means for holding when the digital differences are larger than a selected threshold; and
    the means for holding includes greatest-value latch means for temporarily holding the peak digital values corresponding to the largest digital differences.

7. The system of claim 6 further including;
    AND gate means coupled to the magnitude comparator means and to the window generating means, for clocking the greatest-value latch means during the selected measurement interval.

8. The system of claim 6 further including;
    output latch means coupled to the greatest-value latch means for supplying the peak digital values corresponding to the maximum rate of risetimes and thus to the optimum focus conditions.

9. The system of claim 6 wherein;
    the digital logic control means includes a system clock; and
    latch means operatively coupled to the system clock for selectively latching digital data into the rectifier means, and into the greatest-value latch means and the magnitude comparator means, respectively.

* * * * *